US009614252B2

(12) United States Patent
Yamada et al.

(10) Patent No.: US 9,614,252 B2
(45) Date of Patent: Apr. 4, 2017

(54) LITHIUM SECONDARY BATTERY ELECTROLYTIC SOLUTION AND SECONDARY BATTERY INCLUDING SAID ELECTROLYTIC SOLUTION

(71) Applicant: THE UNIVERSITY OF TOKYO, Bunkyo-ku, Tokyo (JP)

(72) Inventors: Yuki Yamada, Bunkyo-ku (JP); Atsuo Yamada, Bunkyo-ku (JP); Makoto Yaegashi, Bunkyo-ku (JP); Haosheu Zhou, Bunkyo-ku (JP); Fujun Li, Bunkyo-ku (JP)

(73) Assignee: THE UNIVERSITY OF TOKYO, Bunkyo-ku, Tokyo (JP)

( * ) Notice: Subject to any disclaimer, the term of this patent is extended or adjusted under 35 U.S.C. 154(b) by 142 days.

(21) Appl. No.: 14/388,174

(22) PCT Filed: Mar. 25, 2013

(86) PCT No.: PCT/JP2013/058646
§ 371 (c)(1),
(2) Date: Sep. 25, 2014

(87) PCT Pub. No.: WO2013/146714
PCT Pub. Date: Oct. 3, 2013

(65) Prior Publication Data
US 2015/0050563 A1   Feb. 19, 2015

(30) Foreign Application Priority Data

Mar. 26, 2012  (JP) ................... 2012-069738
Mar. 26, 2012  (JP) ................... 2012-069739

(51) Int. Cl.
*H01M 10/0567*  (2010.01)
*H01M 10/0568*  (2010.01)
(Continued)

(52) U.S. Cl.
CPC ....... *H01M 10/0567* (2013.01); *H01M 4/133* (2013.01); *H01M 4/134* (2013.01);
(Continued)

(58) Field of Classification Search
CPC ......... H01M 10/0567; H01M 10/0568; H01M 10/0569; H01M 10/052; H01M 10/0525;
(Continued)

(56) References Cited

U.S. PATENT DOCUMENTS

2009/0053594 A1* 2/2009 Johnson .................. H01M 4/90
429/163
2010/0316909 A1* 12/2010 Armand .............. H01M 4/5825
429/221

(Continued)

FOREIGN PATENT DOCUMENTS

JP     01-107468 A    4/1989
JP     2003-031219 A  1/2003
(Continued)

OTHER PUBLICATIONS

Suo et al. "A New Class of Solvent-in-Salt Electrolyte for High-Energy Rechargeable Metallic Lithium Batteries", Nature Communications, pp. 1-9, (Feb. 12, 2013).*

(Continued)

*Primary Examiner* — Gregg Cantelmo
(74) *Attorney, Agent, or Firm* — Sughrue Mion, PLLC

(57) ABSTRACT

A new electrolytic solution system for lithium secondary batteries. Provided is a lithium secondary battery electrolytic solution containing a nonaqueous solvent and a lithium salt. The nonaqueous solvent is mixed at an amount of not more than 3 mol with respect to 1 mol of the lithium salt.

15 Claims, 15 Drawing Sheets

Lithium insertion /extraction reaction with respect to graphite in DME (CV)

Solvent co-insertion

Normal Li insertion

(51) Int. Cl.

| | | |
|---|---|---|
| *H01M 10/0569* | (2010.01) | |
| *H01M 4/133* | (2010.01) | |
| *H01M 4/134* | (2010.01) | |
| *H01M 4/587* | (2010.01) | |
| *H01M 10/0525* | (2010.01) | |
| *H01M 12/08* | (2006.01) | |
| *H01M 10/052* | (2010.01) | |
| *H01M 4/38* | (2006.01) | |
| *H01M 4/02* | (2006.01) | |

(52) U.S. Cl.
CPC ....... *H01M 4/587* (2013.01); *H01M 10/0525* (2013.01); *H01M 10/0568* (2013.01); *H01M 10/0569* (2013.01); *H01M 4/382* (2013.01); *H01M 10/052* (2013.01); *H01M 12/08* (2013.01); *H01M 2004/027* (2013.01); *H01M 2004/028* (2013.01); *H01M 2300/0025* (2013.01); *Y02E 60/122* (2013.01)

(58) Field of Classification Search
CPC ...... H01M 4/133; H01M 4/134; H01M 4/382; H01M 4/587; H01M 12/08; H01M 2004/027; H01M 2004/028; H01M 2300/0025; Y02E 60/122
See application file for complete search history.

(56) References Cited

U.S. PATENT DOCUMENTS

| | | | | |
|---|---|---|---|---|
| 2011/0236767 | A1 | 9/2011 | Sotowa et al. | |
| 2011/0250506 | A1* | 10/2011 | Koshina | H01M 4/38 429/338 |
| 2011/0269056 | A1* | 11/2011 | Mizuno | H01M 4/8605 429/482 |

FOREIGN PATENT DOCUMENTS

| | | | |
|---|---|---|---|
| JP | EP 1906481 A1 * | 4/2008 | ............ H01G 9/038 |
| JP | 2010-140821 A | 6/2010 | |
| WO | 2009/022664 A1 | 2/2009 | |

OTHER PUBLICATIONS

Yamada et al., "Electrochemical Lithium Intercalation into Graphite in Dimethyl Sulfoxide-Based Electrolytes: Effect of Solvation Structure of Lithium Ion", J. Phys. Chem, 2010, 114, pp. 11680-11685 (Jun. 14, 2010).*

Xu et al. "Novel DMSO-based Electrolyte High Performance Rechargeable Li-O2 Batteries" , Royal Society of Chemistry (2012), pp. S1-S12.*

Cormac O. Laoire et al., "Elucidating the Mechanism of Oxygen Reduction for Lithium-Air Battery Applications," J. Phys. Chem. C, 2009, pp. 20127-20134, vol. 113.

Stefan A. Freunberger et al., "Reactions in the Rechargeable Lithium-$O_2$ Battery with Alkyl Carbonate Electrolytes," Journal of the American Chemical Society, 2011, pp. 8040-8047, vol. 133.

Fuminori Mizuno et al., "Design of Non-aqueous Liquid Electrolytes for Rechargeable Li-$O_2$ Batteries," Electrochemistry, 2011, pp. 876-881, vol. 11.

Bryan D. McCloskey et al., "On the Efficacy of Electrocatalysis in Nonaqueous Li-$O_2$ Batteries," Journal of the American Chemical Society, 2011, pp. 18038-18041, vol. 133.

Kagaku Benran Kosohen, revised 5th edition, 2004, I-774, 776, chapter 5 Kagaku Jikken-yo Zairyo-Tokusei to Jikken Data, table 5. 156.

International Search Report of PCT/JP2013/058646 dated Jun. 18, 2013.

* cited by examiner

Fig. 1
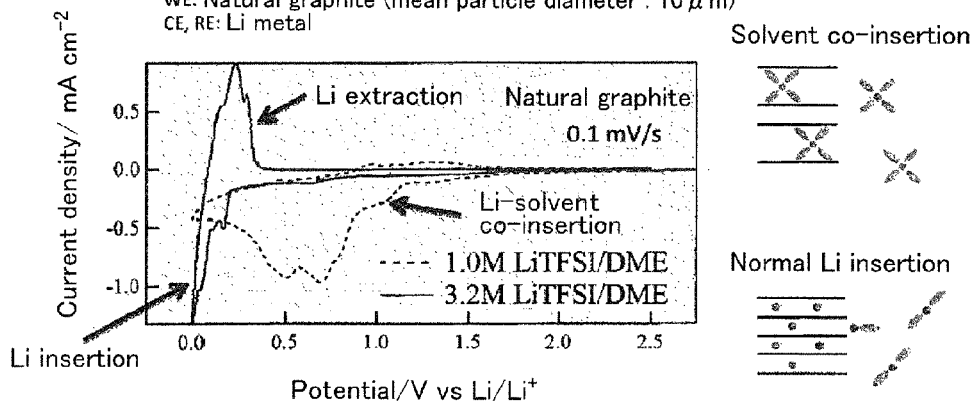
Lithium insertion/extraction reaction with respect to graphite in DME (CV)
Fig. 2
Application to tetrahydrofuran (THF) solvent
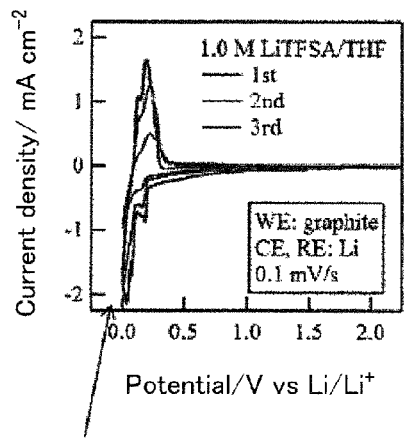
Intense cycle-caused deterioration
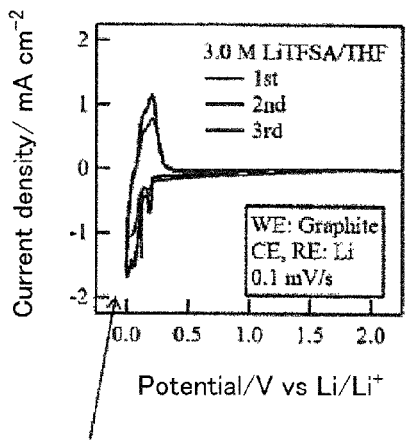
Cycle-caused deterioration suppressed
Natural graphite electrode Application to γ-butyrolactone (GBL) solvent Intense cycle-caused deterioration Cycle-caused deterioration suppressed Natural graphite electrode Application to dimethyl sulfoxide (DMSO) solvent Irreversible reaction (no oxidation peaks)

Reversible reaction

Natural graphite electrode

XRD of graphite held with potentials in LiTFSI/DME electrolytic solution

Lithium insertion/extraction reaction with respect to graphite in DME
(charge-discharge test)

Discharge capacity : approximately 340 mAhg$^{-1}$

Measurement condition
Working electrode : Natural graphite (mean particle diameter : 10mm)
Counter electrode, reference electrode : Li metal
C/20 rate Lithium insertion/extraction reaction with respect to graphite in DME (charge-discharge test)

Measurement condition
Working electrode : Natural graphite (mean particle diameter : 10mm)
Counter electrode, reference electrode : Li metal
C/20 rate Lithium insertion/extraction reaction with respect to graphite in DME (charge-discharge test)

Lithium insertion/extraction reaction with respect to graphite in AN (charge-discharge test)

Measurement condition
Working electrode : Natural graphite (mean particle diameter : 10mm)
Counter electrode, reference electrode : Li metal
C/20 rate Lithium insertion/extraction reaction with respect to graphite in AN (charge-discharge test)

Fig. 8

Lithium insertion/extraction reaction with respect to graphite in THF
(charge-discharge test)

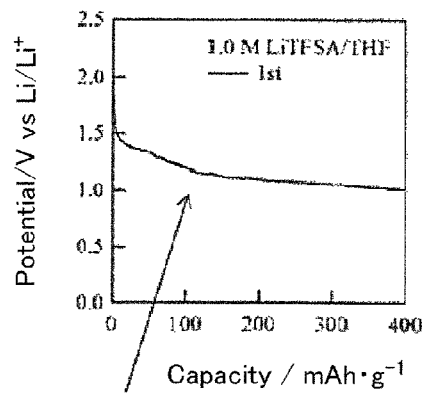

Cannot be used as negative electrode since electric potential became constant at about 1V

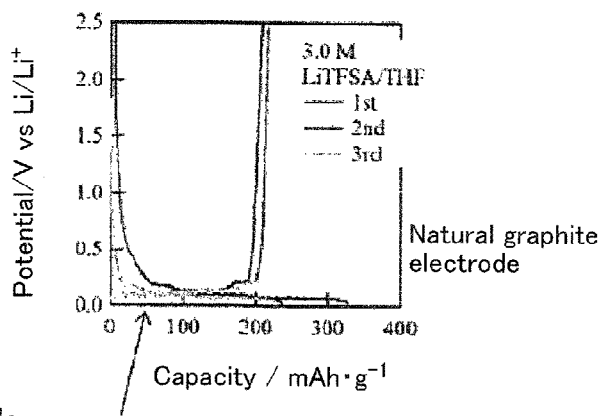

Natural graphite electrode

Can be used as negative electrode since reversible action occurred at about 0.2V

Fig. 9

Lithium insertion/extraction reaction with respect to graphite in DMSO
(charge-discharge test)

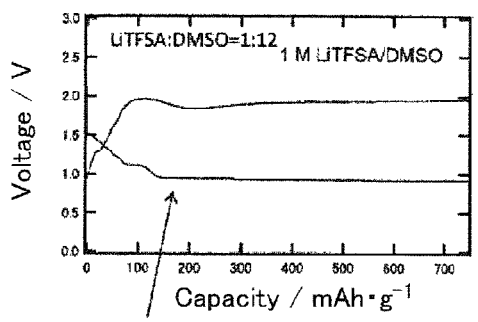

Dose not function as negative electrode since reaction (co-insertion) occurred at about 1V

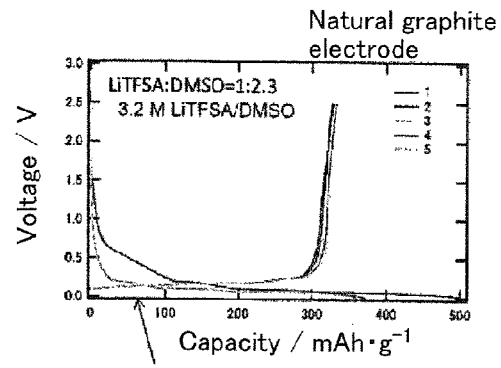

Natural graphite electrode

Capacity close to theoretical value (372 mAh/g) was reversibly obtained

Positive electrode: Vulcan XC-72:PTFE = 90:10 (wt%)
Negative electrode: Lithium metal
Electrolytic solution: 3.2 M LiTFSA/DME Current value: 10 mA/g Positive electrode: Vulcan XC-72:PTFE=90:10 wt%
Negative electrode: Lithium metal
Electrolytic solution: 4.2 M LiTFSA/AN
Atmosphere: In pure oxygen
Current value: 20 mA/g Positive electrode : Ketchen black (ECP):PTFE=90:10 wt%
Negative electrode : Lithium metal
Electrolytic solution : 3.2 M LiTFSA/DMSO
Atmosphere : In pure oxygen
Current value : 20 mA/g 1,2-dimethoxyethane (DME) oxidation-resistance improvement Application to γ-butyrolactone (GBL) solvent Graphite–$O_2$ air full cell Positive electrode : Vulcan XC-72:PTFE=90:10 wt%
Negative electrode : Lithium-doped graphite ($LiC_6$)
    Atmosphere : In pure oxygen
        Rate : C/10 (graphite negative electrode basis)

Lithium deposition dissolution reaction in acetonitrile (AN)

In 4.2 M LiTFSA/AN electrolytic solution
(Sweep rate : 10 mV/s)

Lithium deposition dissolution reaction in acetonitrile (AN)

In 1.0 M LiTFSA/AN electrolytic solution (Sweep rate : 1 mV/s)

LITHIUM SECONDARY BATTERY ELECTROLYTIC SOLUTION AND SECONDARY BATTERY INCLUDING SAID ELECTROLYTIC SOLUTION

CROSS REFERENCE TO RELATED APPLICATIONS

This is a National Stage of International Application No. PCT/JP2013/058646 filed Mar. 25, 2013, claiming priority based on Japanese Patent Application No. 2012-069738 filed Mar. 26, 2012 and Japanese Patent Application No. 2012-069739 filed Mar. 26, 2012, the contents of all of which are incorporated herein by reference in their entirety.

TECHNICAL FIELD

The present invention relates to an electrolytic solution for lithium secondary batteries and a secondary battery including the electrolytic solution. In particular, the present invention relates to a lithium ion-acting type air cell in which a carbon material is used as a negative electrode active material.

BACKGROUND ART

Although lithium ion secondary batteries have been conventionally used as a main power-storage device in fields such as mobile phones, notebook personal computers, and electric vehicles; much smaller and lighter secondary batteries are in demand in recent years. As a result, research is actively conducted for a next-generation secondary battery having a higher energy density than that of lithium ion secondary batteries, and various experiments are underway. In particular, a lithium-air cell, which uses oxygen in the air as a positive electrode active material and uses lithium metal as a negative electrode active material, theoretically has an extremely large discharge capacity since the lithium-air cell does not need to have oxygen, which is the positive electrode active material, disposed inside the cell. Thus, the lithium-air cell is gathering high expectation as a post lithium ion secondary battery for applications such as next-generation electric vehicles and power storage systems for solar/wind power generation facilities. However, reversible and stable charge-discharge is currently difficult to conduct, and the prospect of having the lithium-air cell put to practical use is nowhere in sight.

The lithium-air cell functions through a mechanism in which oxygen reduction (discharging) and oxygen generation (charging) occur at a positive electrode, and lithium dissolution (discharging) and lithium deposition (charging) occur at a negative electrode to enable charging-discharging. Specifically, an oxygen reduction reaction as shown in the following progresses at the positive electrode.

[Num. 1]

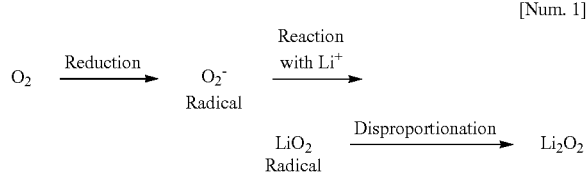

When a solvent in an electrolytic solution is unstable with respect to radicals, a degradative reaction of the solvent is known to occur without the generation of $Li_2O_2$ (Non-Patent Art 1). Thus, for a reversible positive electrode reaction, a solvent that is stable with respect to the radicals has to be used. However, since a carbonate based solvent (propylene carbonate etc.) used in conventional lithium ion batteries reacts with oxygen radicals, the reaction at the positive electrode is reported to be irreversible (Non-Patent Art 2 and 3).

Thus, the selection of the electrolytic solution becomes very important for the reversible progression of the positive electrode reaction for usage in secondary batteries. As solvents capable of harboring such a reversible positive electrode reaction, 1,2-dimethoxyethane, acetonitrile, and ionic liquids etc., have been studied (Non-Patent Art 2, 3, and 4). However, even if the problem of reversibility on the positive electrode side were to be solved by the usage of such solvents, there is an unsolved problem on the negative electrode side, i.e., metal lithium being deposited in a branch-like (dendrite) manner during charging when lithium metal is used as the negative electrode, and the dendrite growing and ultimately reaching the positive electrode through repeated charge-discharge to form a short circuit. Furthermore, when acetonitrile is used as a solvent, the problem is that acetonitrile cannot be used in an air cell of which negative electrode is lithium metal since acetonitrile is highly reactive against lithium metal. Thus, the barrier that currently prevents a lithium-air cell using lithium metal as the negative electrode from being put to practical use is extremely high under present circumstances.

On the other hand, in lithium ion batteries, such a problem of dendrite deposition at the negative electrode is known to be solved by using a carbon material such as graphite or the like as the negative electrode active material. However, reversible insertion/extraction of lithium ions with respect to the negative electrode carbon material have been generally considered not possible with the electrolytic solution solvents, such as 1,2-dimethoxyethane, acetonitrile, and ionic liquids, required for the reversible reaction at the positive electrode using oxygen as the positive electrode active material. Thus, negative electrodes formed of a carbon material in an air cell have been considered as not being a candidate for research. In more detail, a reason for that is because insertion/extraction reactions of lithium ions at a negative electrode formed of a carbon material were generally considered only achievable in the presence of a carbonate based solvent. Additional reasons include undesirable phenomena considered to be caused by the properties of the solvents such as: acetonitrile being not able to withstand electric potential for lithium ion insertion due to being susceptible against reduction; 1,2-dimethoxyethane being inserted to the negative electrode together with lithium ions; and ionic liquids similarly causing insertion of cation species to the negative electrode.

Because of the background described above, building an air cell which solves the problem regarding dendrite deposition at the negative electrode while using a solvent sustainable of a reversible positive electrode reaction has been strongly demanded.

RELATED ART

Non-Patent Art

Non-Patent Art 1: C. O. Laoire et al., J. Phys. Chem. C, 2009, 113, 20127
Non-Patent Art 2: P. G. Bruce et al., J. Am. Chem. Soc., 2011, 133, 8040-8047

Non-Patent Art 3: F. Mizuno et al., Electrochemistry, 2011, 11, 876-881
Non-Patent Art 4: B. D. McCloskey et al., J. Am. Chem. Soc., 2011, 133, 18038-18041

SUMMARY OF THE INVENTION

Problems to be Solved by the Invention

An objective of the present invention is to provide a new electrolytic solution system for lithium secondary batteries. Despite the above described problems, a new idea has been tested in which a carbon material, which is a negative electrode material used in lithium ion batteries for solving the above described problems regarding dendrite deposition at the negative electrode, is used while maintaining the configuration of a positive electrode in a lithium-air cell, and an objective of the present invention is to provide a battery having such a configuration and an electrolytic solution system for achieving the battery.

Means for Solving the Object

For the purpose of solving the above described problems, the present inventors have conducted thorough research. As a result, the present inventors have discovered that an electrolytic solution containing a lithium salt at a high concentration provides specific electrochemical properties, and a reversible reaction at a negative electrode and a positive electrode having the above described configuration is achievable by using the electrolytic solution. In more detail, the present inventors have discovered that reversible insertion/extraction reaction of lithium ions with respect to a negative electrode carbon material becomes possible in an electrolytic solution containing a nonaqueous solvent when a lithium salt is included therein at a high concentration, and oxidation resistance of the electrolytic solution becomes improved. Based on these findings, the present invention has been accomplished.

Thus, the present invention relates to an electrolytic solution for lithium secondary batteries, the electrolytic solution containing a nonaqueous solvent and a lithium salt, wherein the nonaqueous solvent is mixed at an amount of not more than 3 mol with respect to 1 mol of the lithium salt.

The amount of the nonaqueous solvent with respect to 1 mol of the lithium salt is preferably not less than 1 mol but not more than 3 mol, and more preferably not less than 1.5 mol but not more than 2.5 mol.

The lithium salt is preferably lithium bis(trifluoromethanesulfonyl)amide ($Li[N(CF_3SO_2)_2]$), lithium bis(perfluoroethylsulfonyl)amide ($Li[N(C_2F_5SO_2)_2]$), or lithium bis(fluorosulfonyl)amide ($LiN(SO_2F)_2$). More preferably, the lithium salt is lithium bis(trifluoromethanesulfonyl)amide ($Li[N(CF_3SO_2)_2]$).

Furthermore, the nonaqueous solvent is preferably an aprotic solvent, and is more preferably 1,2-dimethoxyethane, acetonitrile, tetrahydrofuran, dimethyl sulfoxide, γ-butyrolactone, or sulfolane.

Another aspect of the present invention relates to a secondary battery including: a positive electrode including a positive electrode active material; a negative electrode including a negative electrode active material capable of occluding and releasing lithium ions; and the electrolytic solution.

Preferably, the positive electrode active material is oxygen. Preferably, the negative electrode active material is a carbon material, and the carbon material is more preferably graphite. In another preferable aspect, the negative electrode active material is metal lithium or a lithium alloy.

Advantages of the Invention

With the present invention, by using an electrolytic solution containing a lithium salt at a high concentration, a carbon material becomes usable as a negative electrode for solving a problem difficult to solve with a conventional solvent system regarding dendrite deposition at a lithium metal negative electrode, and a configuration of a positive electrode of which positive electrode active material is oxygen in the air (i.e., lithium ion-air cell) becomes usable. The present invention overturns the technical common knowledge in which reversible insertion/extraction reaction of lithium ions has been considered difficult when a carbon material is used for a negative electrode in a nonaqueous solvent such as 1,2-dimethoxyethane and acetonitrile, which are appropriate for reversible reaction at an oxygen positive electrode. Thus, advantages of both a conventional lithium ion secondary battery and a lithium metal-air cell are obtained.

Since both above electrodes are made possible, the configuration of the air cell may be maintained at the positive electrode while solving the metal negative electrode problem which has been a major objective for practical use in a conventional lithium-air cell. Thus, the present invention has an advantage of being able to achieve a higher capacity than that of a current lithium ion battery. In addition, regarding a point of being highly safe because of not using lithium metal in a battery, the present invention contributes to putting an air cell to practical use.

Acetonitrile is highly reactive against lithium metal and has been conventionally considered difficult to use in an air cell of which negative electrode is lithium metal. However, since dissolution of lithium metal may be suppressed by containing a lithium salt at a high concentration, a lithium-air cell using an acetonitrile electrolytic solution may be realized.

Being able to use relatively cheap 1,2-dimethoxyethane and acetonitrile etc., as an electrolytic solution solvent is not only useful in terms of cost when compared to ionic liquids and the like, but is superior to ethylene carbonate used mainly in lithium ion batteries at present since these solvents have low melting points.

In addition, since improvement in oxidation resistance of the electrolytic solution has been observed when a lithium salt is included at a high concentration, an advantageous effect of suppression of a degradative reaction of the solvent at the positive electrode is obtained. In addition, with such a high salt concentration, advantageous effects of reduction in volatility of the electrolytic solution and improvement in thermal stability are also obtained. The former advantageous effect is particularly suitable for an open-type air cell since volatilization of the electrolytic solution may be suppressed, and the latter advantageous effect is favorable in terms of safety.

BRIEF DESCRIPTION OF THE DRAWINGS

FIG. 1 is a graph showing measurement results of cyclic voltammetry when lithium salt/DME electrolytic solutions are used;

FIG. 2 includes graphs showing measurement results of cyclic voltammetry when lithium salt/THF electrolytic solutions are used;

FIG. 8 includes graphs showing charge-discharge curves of a graphite electrode when lithium salt/THF electrolytic solutions are used;

FIG. 9 includes graphs showing charge-discharge curves of a graphite electrode when lithium salt/DMSO electrolytic solutions are used;

DETAILED DESCRIPTION OF THE PREFERRED EMBODIMENTS

Figure 3:
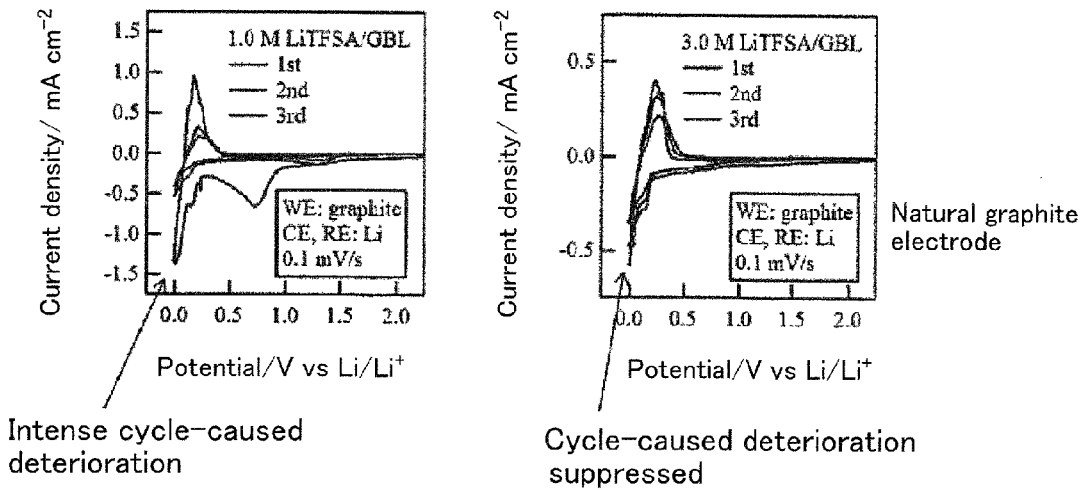
FIG. 3 includes graphs showing measurement results of cyclic voltammetry when lithium salt/GBL electrolytic solutions are used.

In the following, embodiments of the present invention are described. The scope of the present invention is not limited by the following descriptions and various changes other than those illustrated in the following may be made as appropriate without departing from the scope of the present invention.

1. Electrolytic Solution (1) Solvent

As a solvent used in an electrolytic solution of the present invention, a nonaqueous solvent may be used, and examples thereof include: ethers such as ethyl methyl ether and dipropyl ether; nitriles such as methoxypropionitrile; esters such as methyl acetate; amines such as triethylamine; alcohols such as methanol; ketones such as acetone; and fluorine-containing alkanes. With regard to the nonaqueous solvents described above, a single type may be used by itself, or a combination of two or more types may be used. However, the nonaqueous solvent is not limited to those described above.

The nonaqueous solvent is preferably an aprotic organic solvent, and examples thereof include 1,2-dimethoxyethane, acetonitrile, tetrahydrofuran, dimethyl sulfoxide, γ-butyrolactone, and sulfolane. A solvent system of which main component is 1,2-dimethoxyethane (DME) or acetonitrile (AN) is particularly suitable. In addition, a mixed solvent containing another nonaqueous solvent may also be used.

(2) Lithium Salt

The lithium salt used as a supporting electrolyte in the electrolytic solution of the present invention dissociates in the electrolytic solution and supplies lithium ions. The lithium salt may be selected from, but not particularly limited to, for example, $LiN(CF_3SO_2)_2$ (hereinafter, also sometimes referred to as "LiTFSA" or "LiTFSI"), $LiN(C_2F_5SO_2)_2$ (hereinafter, also sometimes referred to as "LiBETI"), $LiCF_3SO_3$, $LiC_4F_9SO_3$, $LiC(CF_3SO_2)_3$, $LiN(CF_3SO_2)(C_2F_5SO_2)$, $LiN(CF_3SO_2)(C_3F_7SO_2)$, $LiN(CF_3SO_2)(C_4F_9SO_2)$, $LiN(SO_2F)_2$ (hereinafter, also sometimes referred to as "LiFSA"), $LiPF_6$, $LiBF_4$, $LiClO_4$, and any combination thereof. The lithium salt is preferably $LiN(CF_3SO_2)_2$, $LiN(C_2F_5SO_2)_2$, or $LiN(SO_2F)_2$, and is more preferably $LiN(CF_3SO_2)_2$.

Although the concentration range of the lithium salt in the electrolytic solution may be a high concentration enabling reversible insertion/extraction reaction of lithium ions with respect to the negative electrode carbon material as long as deposition of the lithium salt does not occur, the amount of the nonaqueous solvent with respect to 1 mol of the lithium salt is preferably not more than 3 mol. The amount of the nonaqueous solvent with respect to 1 mol of the lithium salt is more preferably not less than 1 mol but not more than 3 mol, and is further preferably not less than 1.5 mol but not more than 2.5 mol.

(3) Other Components

Furthermore, the electrolytic solution of the present invention may contain other components if necessary for the purpose of improving the function of the electrolytic solution. Examples of other components include hitherto known overcharge inhibitors, dehydrating agents, deoxidizers, and characteristic improvement assistants for improving cycle characteristics and capacity sustaining characteristics after storage at a high temperature.

Examples of the overcharge inhibitors include: aromatic compounds such as biphenyl, alkyl biphenyl, terphenyl, a partially hydrogenated terphenyl, cyclohexyl benzene, t-butylbenzene, t-amyl benzene, diphenyl ether, and dibenzofuran; partial fluorination products of the aromatic compounds such as 2-fluorobiphenyl, o-cyclohexyl fluorobenzene, and p-cyclohexyl fluorobenzene; and fluorine-containing anisole compounds such as 2,4-difluoroanisole, 2,5-difluoroanisole, and 2,6-difluoroanisole. With regard to the overcharge inhibitors, a single type may be used by itself, or a combination of two or more types may be used.

When the electrolytic solution contains an overcharge inhibitor, the contained amount of the overcharge inhibitor in the electrolytic solution is preferably 0.01 to 5 mass %. When the overcharge inhibitor is contained in the electrolytic solution by not less than 0.1 mass %, preventing ruptures and ignition of a secondary battery due to overcharge becomes easier, and a more stable use of the secondary battery becomes possible.

Examples of the dehydrating agents include molecular sieves, mirabilite, magnesium sulfate, calcium hydride, sodium hydride, potassium hydride, and lithium aluminum hydride. As the solvent used in the electrolytic solution of the present invention, a solvent obtained through dehydration with the dehydrating agent and then rectification may be used. Furthermore, a solvent obtained only through dehydration with the dehydrating agent without performing rectification may be used.

Examples of the characteristic improvement assistants for improving cycle characteristics and capacity sustaining characteristics after being stored at a high temperature include: carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; sulfur-containing compounds such as ethylene sulfite, 1,3-propanesultone, 1,4-butanesultone, methyl methanesulfonate, busulfan, sulfolane, sulfolene, dimethyl sulfone, diphenyl sulfone, methylphenylsulfone, dibutyl disulfide, dicyclohexyl disulfide, tetramethylthiuram monosulfide, N,N-dimethyl methanesulfonamide, and N,N-diethyl methanesulfonamide; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, and cycloheptane; and fluorine-containing aromatic compounds such as fluorobenzene, difluorobenzene, hexafluorobenzene, and benzotrifluoride. With regard to these characteristic improvement assistants, a single type may be used by itself, or a combination of two or more types may be used. When the electrolytic solution contains a characteristic improvement assistant, the contained amount of the characteristic improvement assistant in the electrolytic solution is preferably 0.01 to 5 mass %.

2. Secondary Battery

A secondary battery of the present invention includes a positive electrode, a negative electrode, and the electrolytic solution of the present invention.

(1) Negative Electrode

Examples of the negative electrode for the secondary battery of the present invention include an electrode including a negative electrode active material capable of electrochemically occluding and releasing lithium ions. As the negative electrode active material, a known negative electrode active material for lithium ion secondary batteries may be used, and examples thereof include carbonaceous materials such as natural graphite (graphite), highly oriented graphite (Highly Oriented Pyrolytic Graphite; HOPG), and amorphous carbon. Other examples of the negative electrode active material include lithium metal or metallic compounds such as alloys, metal oxides (e.g., lithium titanates such as $Li_4Ti_6O_{12}$), metal sulfides, and metal nitrides, each of which containing element lithium. Examples of the alloys containing element lithium include lithium aluminum alloys, lithium tin alloys, lithium lead alloys, and lithium silicon alloys. Examples of the metal oxides containing element lithium include lithium titanium oxides ($Li_4Ti_6O_{12}$ etc.) and the like. Examples of the metal nitride containing element lithium include lithium cobalt nitride, lithium iron nitride, and lithium manganese nitride. With regard to these negative electrode active materials, a single type may be used by itself, or a combination of two or more types may be used.

Among those described above, the carbonaceous material such as graphite is preferable as the negative electrode active material. Furthermore, as the carbonaceous material, graphite and a carbonaceous material obtained by covering the surface of graphite with carbon that is more amorphous than the graphite is particularly preferable.

The negative electrode may be a negative electrode including only the negative electrode active material, or may be in a form including, other than the negative electrode active material, at least one of a conductive material and a binding material (binder), attached to a negative electrode current collector as a negative electrode mixture. For example, when the negative electrode active material is in a foil-like form, a negative electrode only having the negative electrode active material may be formed. On the other hand, when the negative electrode active material is in a powder form, a negative electrode having the negative electrode active material and the binding material (binder) may be formed. As a method for forming the negative electrode using a powder negative electrode active material, doctor blade method and a molding method using compression bonding pressing may be used.

As the conductive material, for example, carbon materials, conductive fibers of metal fibers etc., metal powders of copper, silver, nickel, aluminum or the like, and organic conductive materials such as polyphenylene derivatives may be used. As a carbon material, graphite, soft carbon, hard carbon, carbon black, Ketchen black, acetylene black, graphite, activated carbon, carbon nanotube, carbon fiber, or the like may be used. Furthermore, mesoporous carbon obtained through baking such as petroleum pitch or a synthetic resin containing an aromatic ring may also be used.

As the binding agent, for example, a fluorine resin such as polyvinylidene fluoride (PVDF), polytetrafluoroethylene (PTFE), and ethylene tetrafluoroethylene (ETFE), polyethylene, polypropylene, or the like may be suitably used. As the negative electrode current collector, a rod-like body, a plate-like body, a foil-like body, a net-like body, or the like mainly formed from copper, nickel, aluminum, stainless steel, or the like may be used.

(2) Positive Electrode

In the positive electrode of the secondary battery of the present invention, oxygen is preferably used as the positive electrode active material. As the positive electrode, a positive electrode that is ordinarily used as a positive electrode for an air cell may be used. The positive electrode may include a conductive material having a gap through which oxygen and lithium ions are movable, and may include the binding agent. Furthermore, a catalyst for accelerating redox reaction of oxygen may be included.

As the conductive material and the binding agent (binder), the same ones used for the negative electrode may be used.

As a catalyst for efficiently performing redox reaction of oxygen, $MnO_2$, $Fe_2O_3$, NiO, CuO, Pt, Co, and the like may be used. As the binding agent (binder), a binder same as that for the negative electrode may be used.

As the positive electrode current collector, for the purpose of enhancing diffusion of oxygen, a porous body such as a mesh-like (grid-like) metal, a sponge-like (foam-like) metal, a punched metal, and an expanded metal is used. The metal is, for example, copper, nickel, aluminum, stainless steel, or the like.

(3) Separator

A separator used in the secondary battery of the present invention is not particularly limited as long as the separator has a function of electrically separating a positive electrode layer and a negative electrode layer, and examples of the separator include porous insulators such as glass fiber nonwoven fabrics, nonwoven fabrics, and porous sheets formed of a resin of polyethylene (PE), polypropylene (PP), polyester, cellulose, polyamide, or the like.

(4) Shape Etc.

The shape of the secondary battery of the present invention is not particularly limited as long as the positive electrode, the negative electrode, and the electrolytic solution may be housed, and examples thereof include a cylinder, a coin, a plate, a laminate, and the like.

Furthermore, a case for housing the battery may be an atmosphere-exposed type battery case, or may be a sealed type battery case. The atmosphere-exposed type battery case is a battery case having a ventilation hole through which air may move in and out, enabling air to make contact with the air electrode. On the other hand, when the battery case is a sealed type battery case, a supply tube and an emission tube for gas (air) are preferably formed on the sealed type battery case. In this case, the gas that is being supplied or emitted is preferably a dry gas, is more preferably a dry gas of which concentration of oxygen is preferably high, and is much more preferably pure oxygen (99.99%). Furthermore, the oxygen concentration is preferably set high during discharging and set low during charging.

Although the electrolytic solution and the secondary battery of the present invention are suitable in usage as a secondary battery, usage as a primary battery is not excluded.

EXAMPLES

In the following, although the present invention is described in further detail by means of Examples, the present invention is not limited thereto.

Example 1

1. Evaluation of Lithium Insertion/Extraction Behavior at Graphite Electrode (Cyclic Voltammetry)

In order to demonstrate the applicability of the electrolytic solution of the present invention to a carbon material negative electrode, cyclic voltammetry was performed using 1,2-dimethoxyethane (DME) containing a lithium salt as an electrolyte to investigate the change in the current.

Measurements were performed using a three-electrode type electrochemical cell including natural graphite (mean particle diameter: 10 μm) as a working electrode, and metal lithium as a counter electrode and a reference electrode. The potential range was set to 0 to 3.0 V (vs Li/Li$^+$), and the sweep rate was set at 0.1 mv/second. The obtained results are shown in FIG. 1.

As shown in FIG. 1, with a DME solution containing 3.2 M LiTFSA (mole ratio of LiTFSA:DME=1:1.6), insertion and extraction of lithium with respect to the graphite electrode were observed. On the other hand, with a DME solution containing 1.0 M LiTFSA (mole ratio of LiTFSA:DME=1:8.3), a peak indicating such insertion/extraction was not observed, and only a behavior considered as co-insertion of lithium and a solvent molecule was observed. This result shows that adding the lithium salt to the solvent at a high concentration suppresses co-insertion of the solvent molecule, and, although being considered difficult conventionally, reversible lithium insertion/extraction with respect to the graphite electrode is possible even in a solvent of 1,2-dimethoxyethane.

Figure 4:
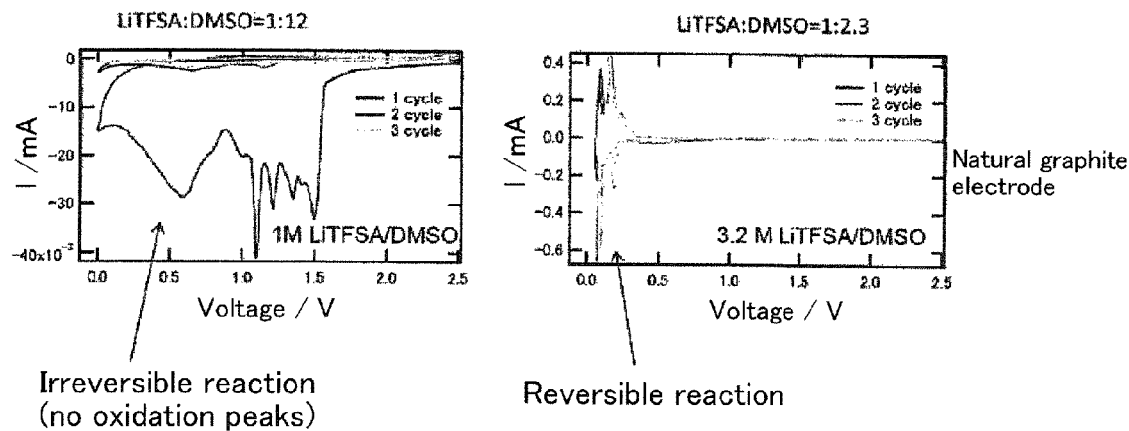
FIG. 4 includes graphs showing measurement results of cyclic voltammetry when lithium salt/DMSO electrolytic solutions are used.

The results of performing similar measurements using tetrahydrofuran (THF), γ-butyrolactone (GBL), or dimethyl sulfoxide (DMSO) as solvents instead of the DME are shown respectively in FIGS. 2 to 4. With THF or GBL, a result was obtained in which deterioration due to cycles was intense with 1.0 M LiTFSA; whereas deterioration due to cycles was suppressed at a higher concentration of 3.0 M LiTFSA. With DMSO, when LiTFSA:DMSO was 1:12, an oxidation peak was not observed in a manner similar to the DME described above, and an irreversible reaction was obtained; whereas, when LiTFSA:DMSO was 1:2.3, a reversible reaction was observed.

Example 2

2. Verification of Solvent Co-Insertion at Negative Electrode

In order to verify the solvent co-insertion behavior at the negative electrode when the electrolytic solution of the present invention was used, X-ray diffraction (XRD) measurement was performed on a powder of graphite of the negative electrode. The device used for the measurement was D8 ADVANCE manufactured by Bruker AXS. Diffraction patterns of graphite held with potentials at 0.03 V and 1.0 V (vs. Li/Li$^+$) in DME electrolytic solutions containing LiTFSA by 1.0 M and 3.2 M are shown in FIG. 5.

Figure 5:
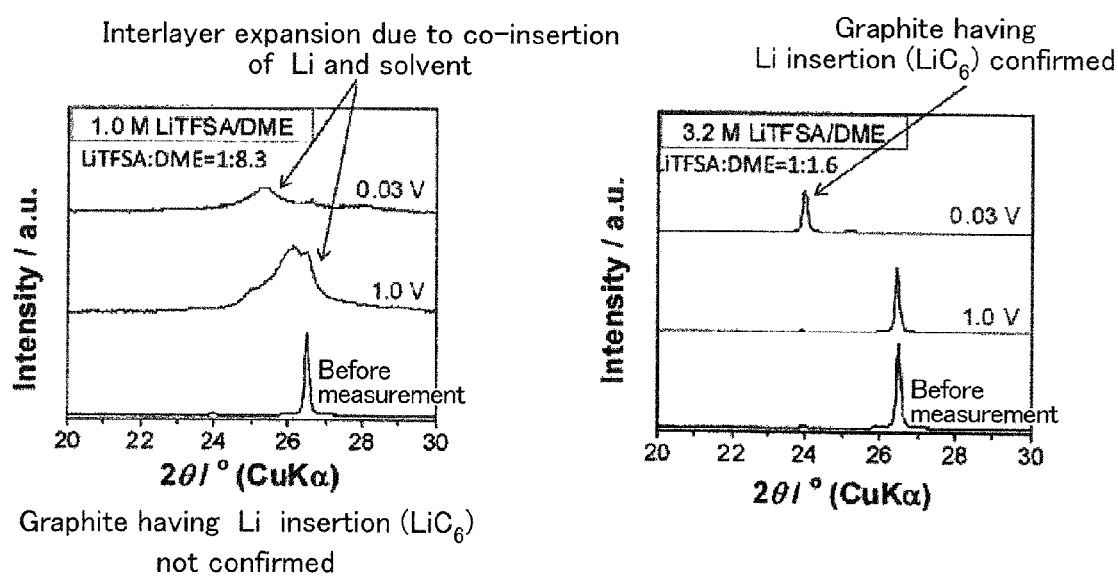
FIG. 5 shows X-ray diffraction patterns of graphite in lithium salt/DME electrolytic solutions.

In FIG. 5, the diffraction peak at the graphite 002 surface was reduced/shifted to low angle in a 1.0 M lithium salt solution (mole ratio of LiTFSA:DME=1:8.3), suggesting insertion of some species at both 0.03 V and 1.0 V. The peak has been reported to indicate occurrence of lithium-solvent co-insertion (T. Abe et al., J. Electrochem. Soc., 2004, 151, A1120). On the other hand, a peak derived from graphite having an insertion of Li(LiC$_6$) was not observed.

However, in a 3.2 M lithium salt solution (mole ratio of LiTFSA:DME=1:1.6), a peak derived from graphite having an insertion of Li(LiC$_6$) was observed at 0.03 V. On the other hand, at 1.0 V, a change in peak was not observed at the 002 surface, suggesting solvent co-insertion, which is a side reaction at the negative electrode, had not occurred.

These results indicate that, in the electrolytic solution of the present invention containing the lithium salt at a high concentration, solvent co-insertion to graphite was suppressed and insertion of Li to graphite had occurred. As a result, reversible lithium ion insertion/extraction became possible even with DME that could not be conventionally applied to a graphite negative electrode because of the solvent co-insertion.

Example 3

3. Evaluation of Reversible Charge-Discharge Reaction at Graphite Electrode (Charge-Discharge Test)

Next, by using electrolytic solutions containing 1.0 M or 3.2 M LiTFSA, single-electrode potentials at a graphite electrode were measured and a comparison of charge-discharge behavior was conducted. The measurement was performed using a charge-discharge measuring device (VMP-3 manufactured by BioLogic). The conditions regarding the electrode were the same as those in Example 1. The obtained results are shown in FIGS. 6A and 6B.

Figure 6A:
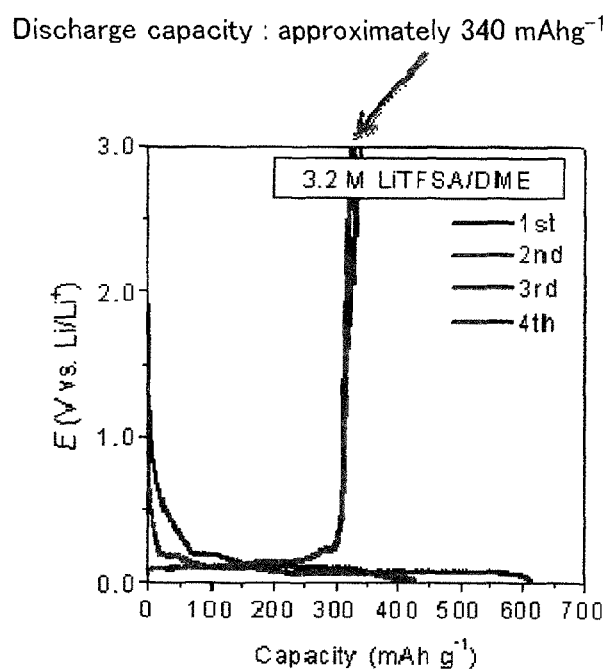
FIGS. 6A and 6B are graphs showing charge-discharge curves of a graphite electrode when lithium salt/DME electrolytic solutions are used.
Figure 6B:
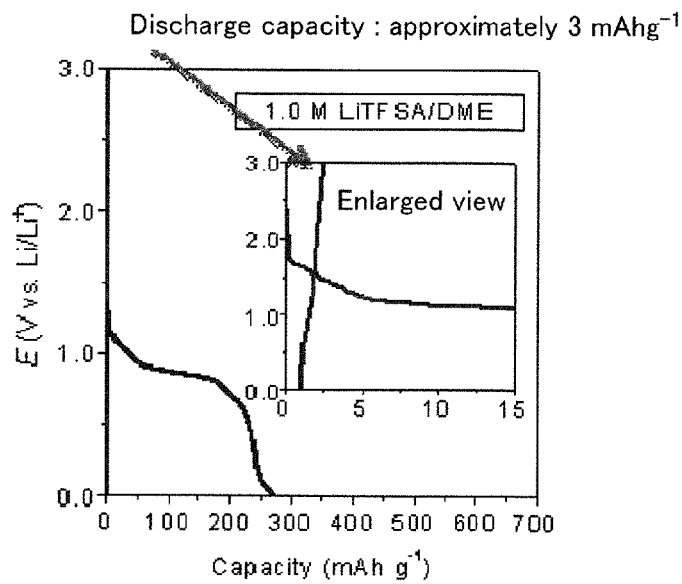

The results in FIG. 6A show that, in a DME solution containing 3.2 M LiTFSA (mole ratio of LiTFSA:DME=1:1.6), although the initial irreversible capacity became large to a certain degree, reversible charge-discharge was obtained at a discharge capacity of approximately 340 mAhg$^{-1}$ which is close to the theoretical capacity (372 mAhg$^{-1}$) of a graphite electrode. This is considered a high capability not conventionally obtained for an electrolytic solution that does not contain vinylene carbonate as an additive or an ethylene carbonate solvent commonly used in a lithium ion battery. On the other hand, the results in FIG. 6B shows that such a discharge capacity was not obtained with a DME solution containing 1.0 M LiTFSA (mole ratio of LiTFSA:DME=1:8.3).

Figure 6C:
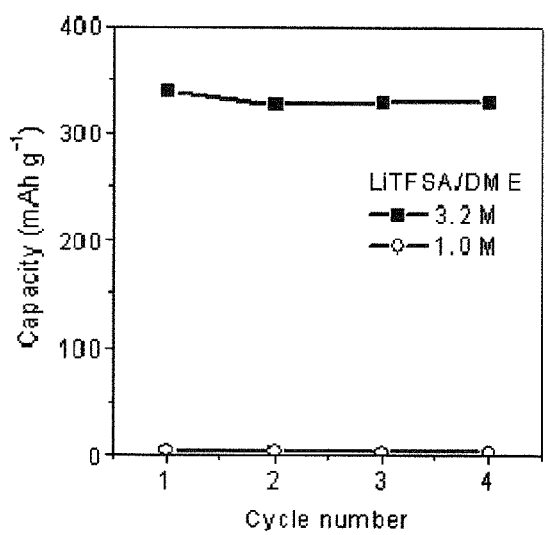
FIG. 6C is a graph showing cycle characteristics.

FIG. 6C shows cycle characteristics of the discharge capacity in the charge-discharge test. With the DME solution containing 3.2 M LiTFSA, reduction in the discharge capacity was almost not observed even when the number of cycles was increased, and cycle deterioration was indicated not to have occurred.

Based on the salt concentration dependence of the discharge capacity described above and the fact that such a discharge capacity cannot be obtained by only adding vinylene carbonate to DME, the discharge capacity is suggested to be due to the lithium salt existing at a high concentration. This result demonstrates the effectiveness of the negative electrode reaction in the electrolytic solution of the present invention containing the lithium salt at a high concentration.

Figure 7A:
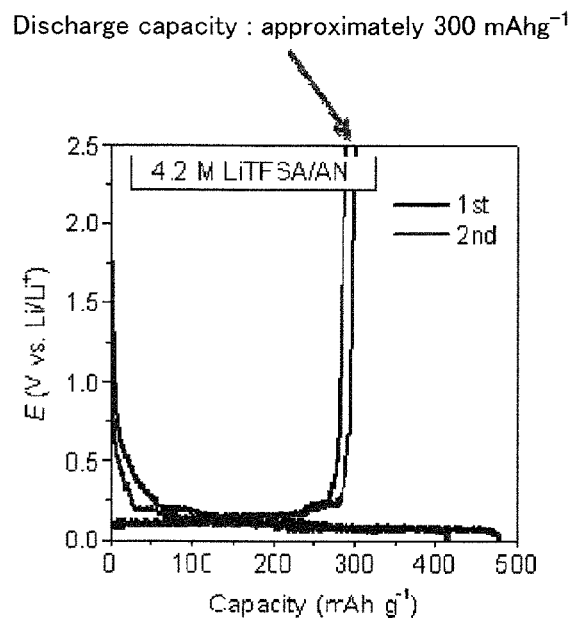
FIGS. 7A and 7B are graphs showing charge-discharge curves of a graphite electrode when lithium salt/AN electrolytic solutions are used.
Figure 7B:
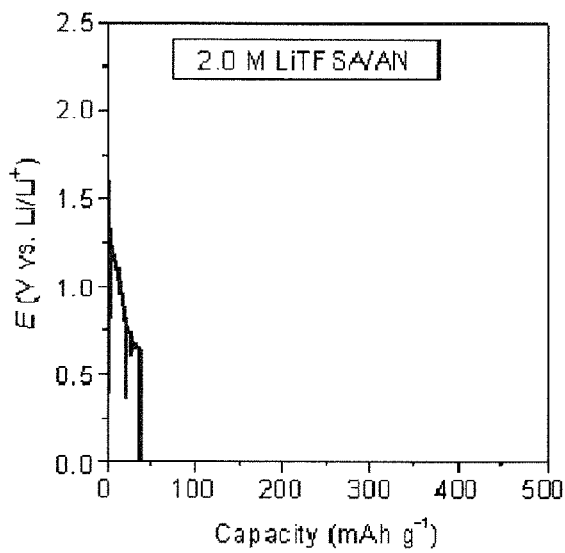

FIGS. 7A and 7B show the results of conducting the charge-discharge test with the same conditions also when acetonitrile (AN) was used as a solvent. The result in FIG. 7A shows that, in an AN solution containing 4.2 M LiTFSA (mole ratio of LiTFSA:AN=1:1.9), reversible charge-discharge was obtained at a discharge capacity of approximately 300 mAhg$^{-1}$. On the other hand, the result in FIG. 7B shows that such a discharge capacity was not obtained with an AN solution containing 2.0 M LiTFSA (mole ratio of LiTFSA:AN=1:6). This result demonstrates, similarly to when DME was used, the effectiveness of the negative electrode reaction in the electrolytic solution of the present invention using acetonitrile.

Figure 10:
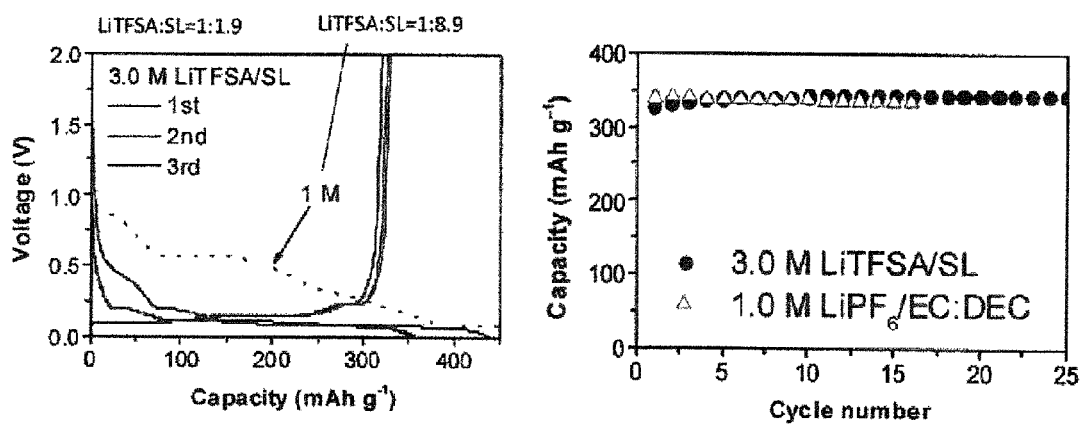
FIG. 10 includes graphs showing charge-discharge curves of a graphite electrode when lithium salt/SL electrolytic solutions are used, and a comparison of cycle characteristics with an EC:DEC electrolytic solution system.

Charge-discharge tests were performed also similarly by using THF, DMSO, and SL as solvents (FIGS. 8, 9, and 10, respectively). The results show that reversible action occurred in all cases with high concentration of the Li salt (mole ratio of LiTFSA:DMSO=1:2.3 and LiTFSA:SL=1:1.9), and, in particular, with DMSO and SL, reversible charge-discharge was obtained at a discharge capacity close to the theoretical capacity of a graphite electrode. On the other hand, irreversible actions were observed in all cases with low concentration of the Li salt (mole ratio of LiTFSA:DMSO=1:12 and LiTFSA:SL=1:8.9). Furthermore, the case with SL shown in FIG. 10 (right figure) shows cycle characteristics equivalent to those of a commercially used EC:DEC mixed solvent system.

Example 4

4. Charge-Discharge Test at Air Positive Electrode

In order to confirm the applicability of the electrolytic solution of the present invention to air positive electrodes, a charge-discharge test was performed at an air positive electrode using the electrolytic solution of the present invention. The measurement was performed with an open-type coin cell using carbon black (Vulcan XC-72):PTFE (polytetrafluoroethylene)=90:10 (wt %) for the positive electrode, and metal lithium for the negative electrode. The electrolytic solution was a DME solution containing 3.2 M LiTFSA (mole ratio of LiTFSA:DME=1:1.6), and the current value was 10 mA/g. The obtained results are shown in FIG. 11.

Figure 11:
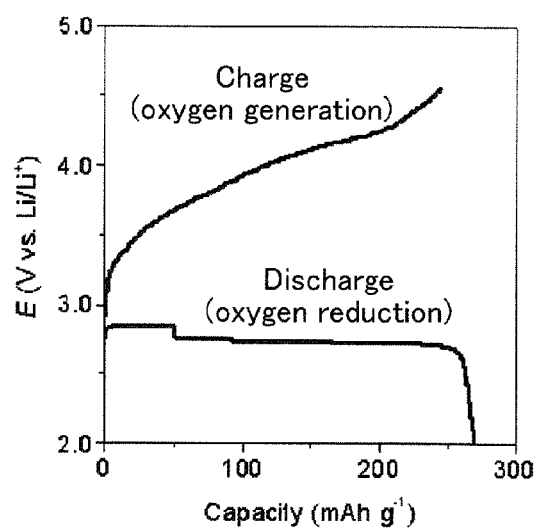
FIG. 11 is a graph showing charge-discharge curves of an air positive electrode when a lithium salt/DME electrolytic solution is used.

The results in FIG. 11 confirm that, even when a DME electrolytic solution containing the lithium salt at a high concentration was used, reversible oxygen reduction generation reaction, i.e., reversible charge-discharge, was obtained at the air positive electrode.

Furthermore, the charge-discharge test was also performed at the air positive electrode similarly in cases where AN and DMSO were used as solvents. The results are shown in FIGS. 12 and 13.

Figure 12A:
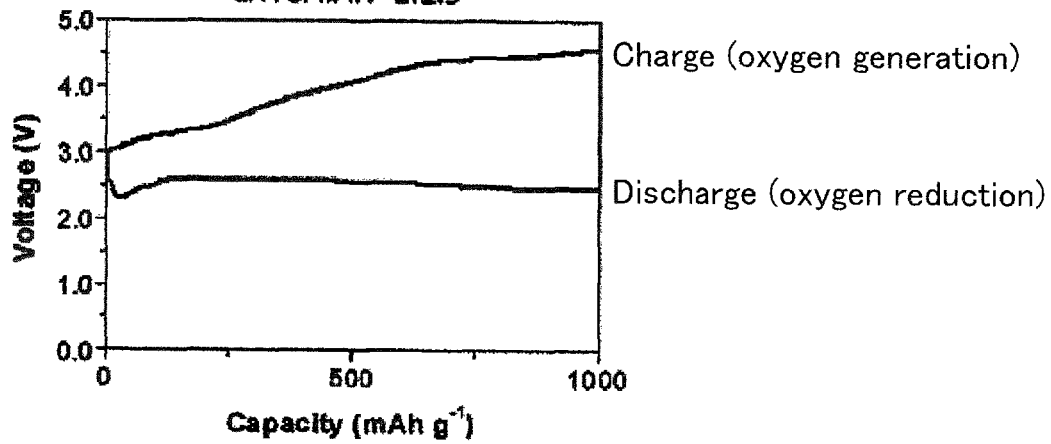
FIG. 12 includes a graph showing charge-discharge curves of an air positive electrode when a lithium salt/AN electrolytic solution is used, and a graph showing X-ray diffraction patterns of a positive electrode after discharge.
Figure 12B:
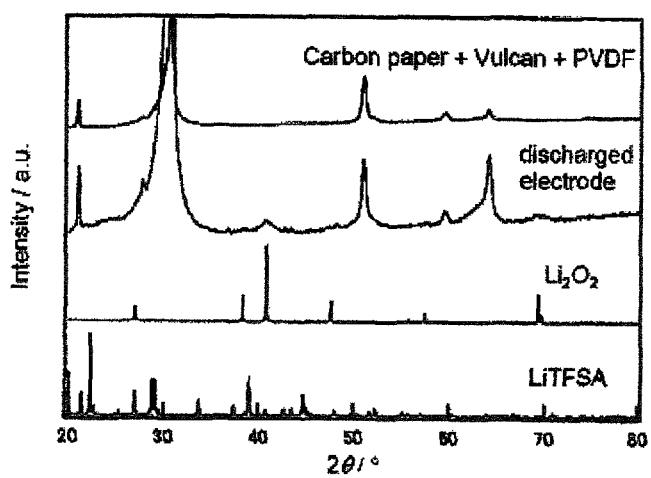
Figure 13:
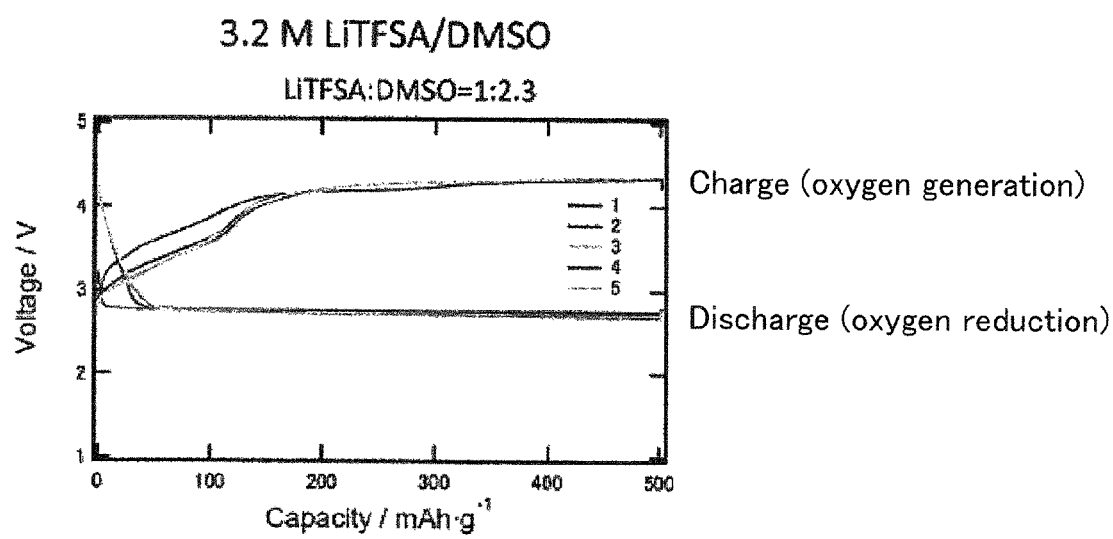
FIG. 13 is a graph showing charge-discharge curves of an air positive electrode when a lithium salt/DMSO electrolytic solution is used.

The results in FIG. 12 confirm reversible charge-discharge similarly to FIG. 11 also in an AN electrolytic solution containing the lithium salt at a high concentration (mole ratio of LiTFSA:AN=1:1.9). In addition, since a peak of Li$_2$O$_2$ was observed in an XRD measurement (FIG. 12) on the positive electrode after discharge, a reaction of

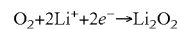

$$O_2 + 2Li^+ + 2e^- \rightarrow Li_2O_2$$

was recognized to have occurred at the positive electrode.

As shown in FIG. 13, also in a DMSO electrolytic solution containing the lithium salt at a high concentration (mole ratio of LiTFSA:DMSO=1:2.3), an extremely reversible charge-discharge without cycle deterioration was confirmed.

These results demonstrate, similar to the results from the negative electrode shown in Examples 1 to 3, the effectiveness of the positive electrode reaction when the electrolytic solution of the present invention is used.

Examples 1 to 4 described above show that, by using the electrolytic solution of the present invention, reversible reaction may be achieved at both the positive electrode and the negative electrode in the configuration of "lithium ion-air cell".

Example 5

5. Verification of DME Oxidation-Resistance Improvement

In order to evaluate electrochemical stability of the solvent in the electrolytic solution of the present invention, oxidation potential of DME was measured at each of the lithium salt concentrations. The oxidation potential was measured by the linear sweep voltammetry method using a three-electrode type cell including platinum as a working electrode, and metal lithium as a counter electrode and a reference electrode. During the measurement, the potential at the working electrode was swept toward the high potential side from an immersion potential. The sweep rate was set at 1 my/second. The results (LSV curves) are shown in FIG. 14.

Figure 14:
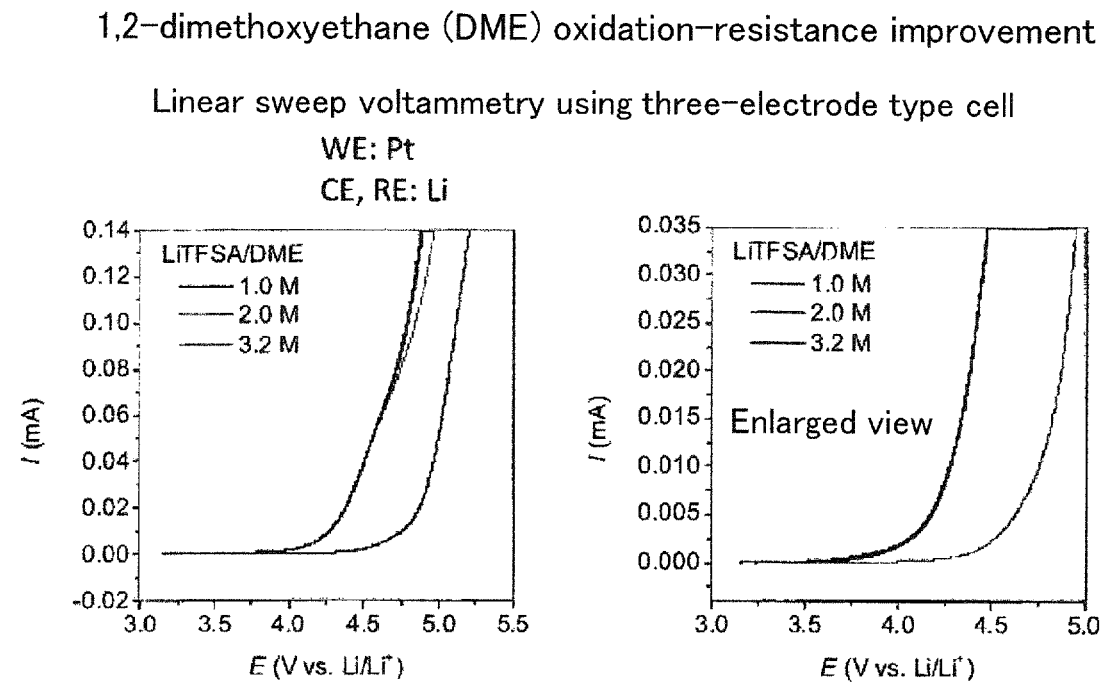
FIG. 14 includes graphs showing linear sweep voltammetry curves when lithium salt/DME electrolytic solutions are used.

As shown in FIG. 14, when the salt concentration was 1.0 M (mole ratio of LiTFSA:DME=1:8.3) and 2.0 M (mole ratio of LiTFSA:DME=1:3.5), an increase in the current value was observed starting at a potential of around approximately 3.7 V. On the other hand, when the salt concentration was 3.2 M (mole ratio of LiTFSA:DME=1:1.6), only a very small current was observed even at a potential around 4.2 V, and a shift of the DME oxidation potential to the noble side was observed. When platinum is used as the working electrode, since an active oxidation reduction system does not exist in the electrode and the solution significantly, the observed current here is considered to be due to oxidative degradation of the electrolytic solution solvent itself. Thus, in the electrolytic solution of the present invention, adding the lithium salt at a high concentration clearly improves oxidation resistance.

With regard to the above described point, the results of orbital energy calculation through density functional formalism and Raman spectrum of the electrolytic solution revealed that almost all DME molecules were solvated to lithium ions and free DME molecules did not exist in the solution of which salt concentration was 3 M, and that HOMO was greatly reduced through solvation (complex formation) to the lithium ions, i.e., the DME in the solvation state was stabilized against oxidation. The results also support the improvement in the oxidation resistance.

Figure 15:
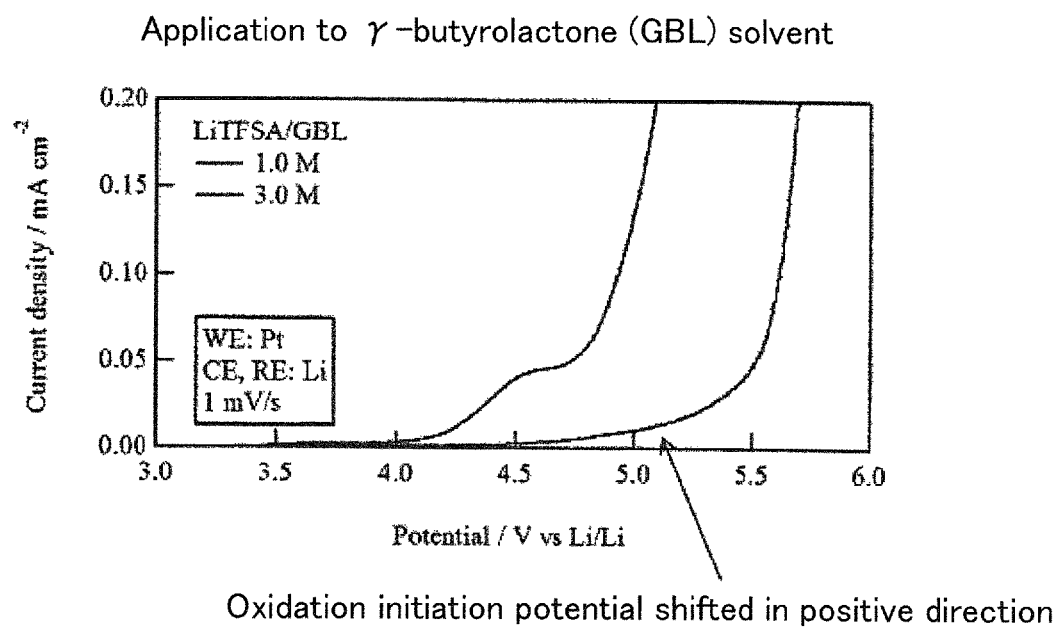
FIG. 15 is a graph showing linear sweep voltammetry curves when lithium salt/GBL electrolytic solutions are used.

Lithium salt concentration dependence of the oxidation potential was also measured in a system using GBL as a solvent. As shown in FIG. 15, when the salt concentration was 1.0 M, an increase in the current value was observed starting at a potential of around approximately 4.0 V, whereas when the salt concentration was 3.0 M, only a very small current was observed even at a potential of around 4.0 V. Thus, a shift of the GBL oxidation potential to the noble side was observed, and an improvement in oxidation resistance by adding the lithium salt at a high concentration was observed similarly to the case with the DME.

Example 6

6. Charge-Discharge Test of Graphite-$O_2$ Air Full Cell

Figure 16:
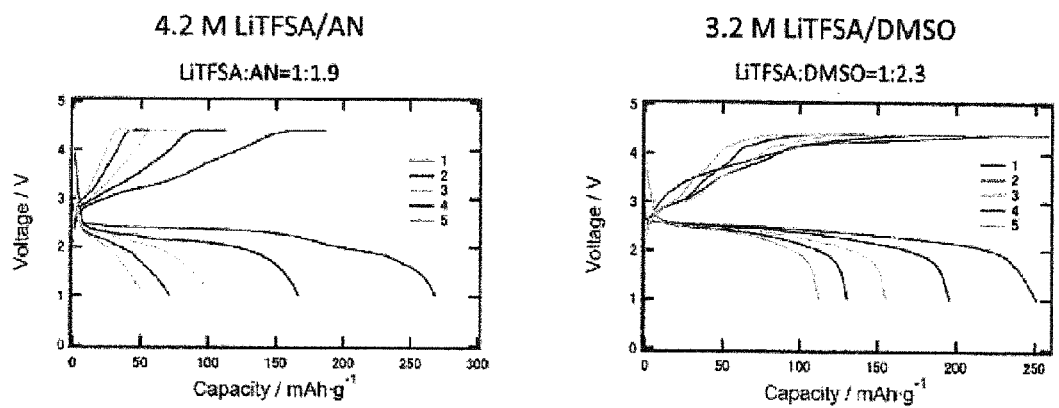
FIG. 16 includes graphs showing charge-discharge curves of a graphite-$O_2$ air full cell using a lithium salt/AN electrolytic solution and a lithium salt/DMSO electrolytic solution.

An open-type coin cell was made with carbon black (Vulcan XC-72):TFE (polytetrafluoroethylene)=90:10 (wt %) as a positive electrode and lithium-doped graphite ($LiC_6$) as a negative electrode, and the charge-discharge test was performed thereon. As the electrolytic solution, an AN solution containing 4.2 M LiTFSA, and a DMSO solution containing 3.2 M LiTFSA were used. The obtained results are shown in FIG. 16. In both of the solvent systems, reversible charge-discharge was confirmed.

Example 7

7. Verification of Reactivity of Lithium Metal and Acetonitrile Solution Containing Lithium Salt Acetonitrile solutions containing 1.0 to 5.0 mol/L of LiTFSA ($LiN(CF_3SO_2)_2$) were prepared, pieces of lithium metal were immersed in each of the solutions, and reactions of the lithium metal were observed. The results are shown in Table 1.

TABLE 1

| Salt concentration (mol $dm^{-3}$) | Reactivity with lithium metal (Lithium metal was immersed and left in electrolytic solution) |
|---|---|
| 1.0 | Lithium metal gradually dissolved, and disappeared after several hours. |
| 2.0 | Lithium metal dissolved, and generation of gas was also observed. |
| 3.2 | The color of the surface of lithium metal changed. |

TABLE 1-continued

| Salt concentration (mol $dm^{-3}$) | Reactivity with lithium metal (Lithium metal was immersed and left in electrolytic solution) |
|---|---|
| 4.2 | Nothing unusual happened to lithium metal after several days. |
| 5.0 | Nothing unusual happened to lithium metal after several days. |

As shown in Table 1, as the concentration of the lithium salt increased, dissolution of the lithium metal to acetonitrile was not observed. The result shows that adding the lithium salt at the high concentration reduces reactivity of acetonitrile and lithium metal, enabling stable existence of acetonitrile in the solution. The mole ratio of the lithium salt and the solvent in the 4.2 M solution at which reactivity was significantly reduced is LiTFSA:AN=1:1.9.

Example 8

8. Analysis of Lithium Deposition Dissolution Reaction in Acetonitrile Electrolytic Solution Containing Lithium Salt In order to demonstrate the applicability of the electrolytic solution of the present invention to a lithium metal negative electrode, cyclic voltammetry was performed using an acetonitrile electrolytic solution containing the lithium salt as an electrolyte to investigate the change in the current. Measurements were performed using a three-electrode type electrochemical cell including a nickel electrode as a working electrode, and metal lithium as a counter electrode and a reference electrode. The potential range was set to −0.5 to 2.0 v (vs Li/$Li^+$), and the sweep rate was set at 1 my/second or 10 my/second. The obtained results are shown in FIG. 17.

Figure 17A:
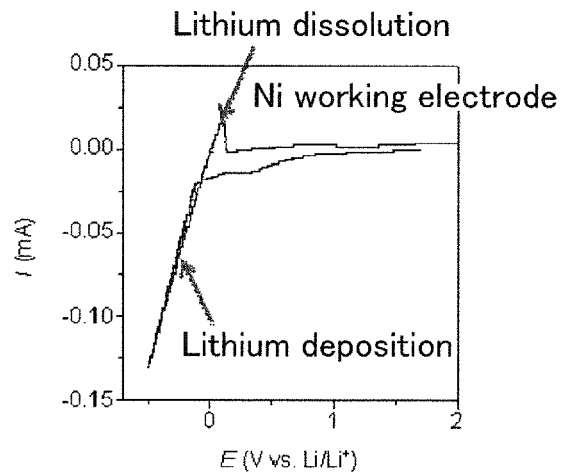
FIGS. 17A and 17B are cyclic voltammetry graphs showing lithium deposition dissolution reaction in LiTFSA/acetonitrile electrolytic solutions.
Figure 17B:
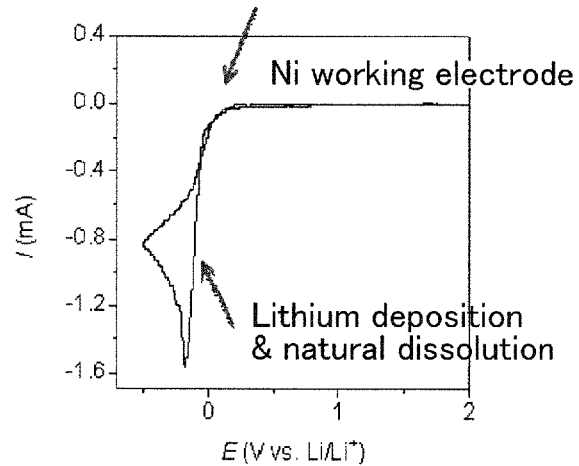
Figure 18A:
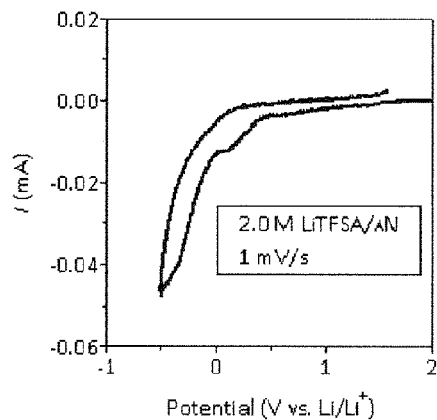
FIGS. 18A to 18D are cyclic voltammetry graphs showing lithium deposition dissolution reactions in LiTFSA/acetonitrile electrolytic solutions having salt concentrations different from those in FIG. 17.
Figure 18B:
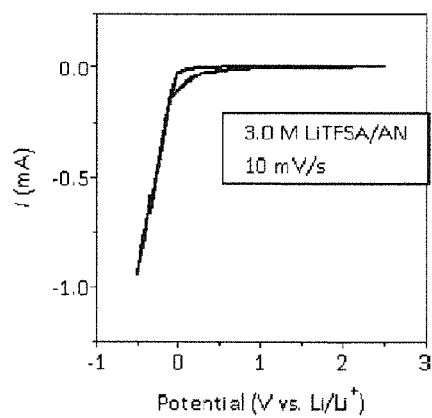
Figure 18C:
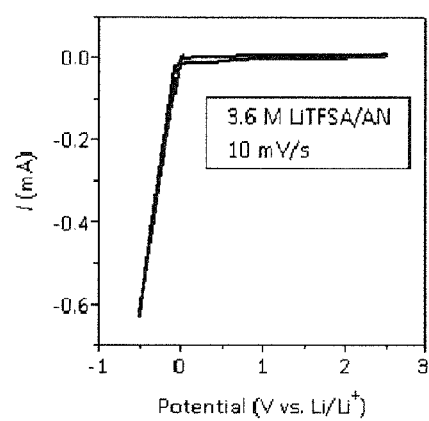
Figure 18D:
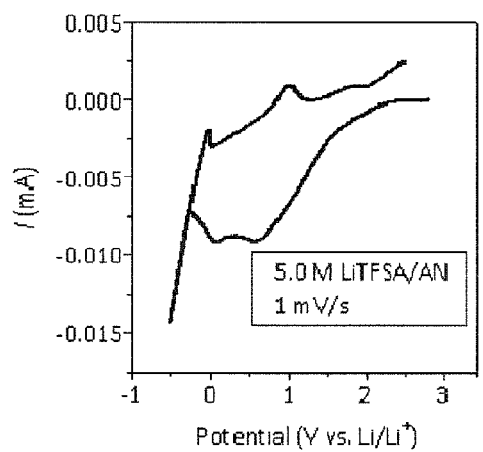

As shown in FIG. 17A, with an acetonitrile solution containing 4.2 mol/L LiTFSA (mole ratio of LiTFSA:AN=1: 1.9), since the lithium metal existed stably in the electrolytic solution, a peak (oxidation peak) indicating lithium dissolution reaction was observed when a reverse sweep of potential was performed. On the other hand, with an acetonitrile solution containing 1.0 mol/L LiTFSA (mole ratio of LiTFSA:AN=1:16) shown in FIG. 17B, a peak indicating such lithium dissolution reaction was not observed. This is thought to be due to lithium metal naturally reacting with acetonitrile in the electrolytic solution, causing a large flow of current and natural dissolution of the deposited lithium. The results described above show that, by using the acetonitrile electrolytic solution containing the lithium salt at a high concentration, lithium deposition dissolution reaction in acetonitrile, considered impossible hitherto, becomes possible.

FIG. 18 shows the results of performing similar measurements in LiTFSA solutions with other concentrations. The sweep rates are shown in the figure. Although clear dissolution peaks were not observed at concentrations of 2.0 mol/L (mole ratio of LiTFSA:AN=1:6) and 3.0 mol/L (mole ratio of LiTFSA:AN=1:3.5) (FIGS. 18A and 18B, respectively), a dissolution peak was observed at a concentration of 3.6 mol/L (mole ratio of LiTFSA:AN=1:2.5) (FIG. 18C). This shows that, when using LiTFSA as the lithium salt, a salt concentration higher than that in a mole ratio of LiTFSA:AN=1:2.5 is preferable. On the other hand, although a dissolution peak was observed at a concentration of 5.0 mol/L (mole ratio of LiTFSA:AN=1:1) (FIG. 18D), since a behavior thought to be a side reaction was observed, a salt concentration equal to or lower than that in a mole ratio of LiTFSA:AN=1:1.2 may be more considered preferable.

Figure 19:
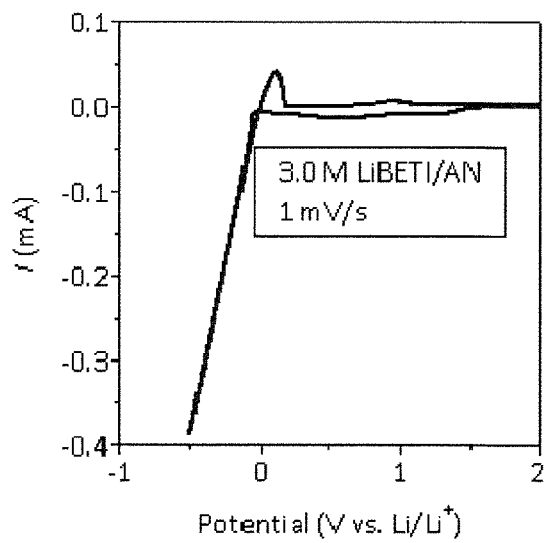
FIG. 19 is a cyclic voltammetry graph showing lithium deposition dissolution reaction in a LiBETI/acetonitrile electrolytic solution.

FIG. 19 shows the results of performing similar measurements in an acetonitrile electrolytic solution containing LiBETI (LiN($C_2F_5SO_2$)$_2$), which is a lithium salt different from LiTFSA, (mole ratio of LiBETI:AN=1:2). The results show that a clear dissolution peak was observed, and a similar advantageous effect was also obtained with a lithium salt other than LiTFSA.

The results from Examples 7 and 8 demonstrate that the electrolytic solution of the present invention can solve the conventional problem in a lithium metal negative electrode with an acetonitrile based electrolytic solution and function as a suitable electrolytic solution, since a lithium salt stably exists in acetonitrile containing the lithium salt at a high concentration, the deposition dissolution reaction occurs by an electric potential sweep.

While specific embodiments of the present invention have been described in detail, these embodiments are merely illustrative and are not intended to limit the scope of the claims. The invention described in the claims includes various modifications and changes of the specific embodiments illustrated above.

The invention claimed is:

1. A secondary battery comprising: a positive electrode including a positive electrode active material; a negative electrode including a negative electrode active material capable of occluding and releasing lithium ions; and an electrolytic solution for lithium secondary batteries
   wherein the electrolytic solution comprising a nonaqueous solvent and a lithium salt, wherein the nonaqueous solvent is mixed at an amount of not more than 3 mol with respect to 1 mol of the lithium salt; and
   the positive electrode active material is oxygen; and
   the nonaqueous solvent is acetonitrile, tetrahydrofuran, dimethyl sulfoxide, γ-butyrolactone, or sulfolane.

2. The secondary battery according to claim 1, wherein the nonaqueous solvent is mixed at an amount of not less than 1 mol but not more than 3 mol with respect to 1 mol of the lithium salt.

3. The secondary battery according to claim 2, wherein the nonaqueous solvent is mixed at an amount of not less than 1.5 mol but not more than 2.5 mol with respect to 1 mol of the lithium salt.

4. The secondary battery according to claim 1, wherein the lithium salt is lithium bis(trifluoromethanesulfonyl)amide (Li[N($CF_3SO_2$)$_2$]), lithium bis(perfluoroethylsulfonyl)amide (Li[N($C_2F_5SO_2$)$_2$]), or lithium bis(fluorosulfonyl)amide (LiN($SO_2F$)$_2$).

5. The secondary battery according to claim 1, wherein the nonaqueous solvent is an aprotic solvent.

6. The secondary battery according to claim 1, wherein the negative electrode active material is a carbon material.

7. The secondary battery according to claim 6, wherein the carbon material is graphite.

8. The secondary battery according to claim 1, wherein the negative electrode active material is metal lithium or a lithium alloy.

9. The secondary battery according to claim 1, wherein the negative electrode active material is a carbon material; and the nonaqueous solvent is acetonitrile, tetrahydrofuran, dimethyl sulfoxide, γ-butyrolactone, or sulfolane.

10. The secondary battery according to claim 1, wherein the negative electrode active material is a carbon material; and the lithium salt is lithium bis(trifluoromethanesulfonyl)amide (Li[N($CF_3SO_2$)$_2$]), lithium bis(perfluoroethylsulfonyl)amide (Li[N($C_2F_5SO_2$)$_2$]), or lithium bis(fluorosulfonyl)amide (LiN($SO_2F$)$_2$).

11. The secondary battery according to claim 1, wherein the lithium salt is lithium bis(trifluoromethanesulfonyl)amide (Li[N($CF_3SO_2$)$_2$]), lithium bis(perfluoroethylsulfonyl)amide (Li[N($C_2F_5SO_2$)$_2$]), or lithium bis(fluorosulfonyl)amide (LiN($SO_2F$)$_2$); and the nonaqueous solvent is acetonitrile, tetrahydrofuran, dimethyl sulfoxide, γ-butyrolactone, or sulfolane.

12. The secondary battery according to claim 1, wherein the negative electrode active material is a carbon material; the nonaqueous solvent is acetonitrile, tetrahydrofuran, dimethyl sulfoxide, γ-butyrolactone, or sulfolane; and the lithium salt is lithium bis(trifluoromethanesulfonyl)amide (Li[N($CF_3SO_2$)$_2$]), lithium bis(perfluoroethylsulfonyl)amide (Li[N($C_2F_5SO_2$)$_2$]), or lithium bis(fluorosulfonyl)amide (LiN($SO_2F$)$_2$).

13. The secondary battery according to claim 12, wherein the carbon material is graphite.

14. The secondary battery according to claim 1, wherein the negative electrode active material is a metal lithium or a lithium alloy; and the nonaqueous solvent is acetonitrile, tetrahydrofuran, dimethyl sulfoxide, γ-butyrolactone, or sulfolane.

15. The secondary battery according to claim 1, wherein the negative electrode active material is a metal lithium or a lithium alloy; and the lithium salt is lithium bis(trifluoromethanesulfonyl)amide (Li[N($CF_3SO_2$)$_2$]), lithium bis(perfluoroethylsulfonyl)amide (Li[N($C_2F_5SO_2$)$_2$]), or lithium bis(fluorosulfonyl)amide (LiN($SO_2F$)$_2$).

* * * * *